Nov. 8, 1932.  C. A. ROGERS  1,887,042

HEAVY DUTY HIGH SPEED TRAILER

Filed Sept. 13, 1930    2 Sheets-Sheet 1

Inventor
Charles A. Rogers,
By Justin W. Macklin,
his Attorney

Nov. 8, 1932. C. A. ROGERS 1,887,042
HEAVY DUTY HIGH SPEED TRAILER
Filed Sept. 13, 1930 2 Sheets-Sheet 2

Inventor
Charles A. Rogers
By Justin W. Macklin,
his Attorney

Patented Nov. 8, 1932

1,887,042

UNITED STATES PATENT OFFICE

CHARLES A. ROGERS, OF ALBION, PENNSYLVANIA

HEAVY DUTY HIGH SPEED TRAILER

Application filed September 13, 1930. Serial No. 481,646.

This invention relates to heavy duty vehicles and is particularly concerned with a trailer for carrying very heavy loads at comparatively high rates of speed.

In the construction of such trailers, many statutory requirements must be considered. The more pertinent of these requirements include limitations of the overall width of trailers, the weight which may be carried on each wheel and on each axle, and the weight carried per unit width of tire. Again many states limit the number of wheels which may be placed in axial alignment.

An object of my invention is to overcome the structural difficulties which compliance with these and other limitations presents.

An important feature of my invention which enables me to comply with these requirements resides in the wheel supporting frame which permits the use of a large number of wheels and axles without an increase in trailer width, thus reducing both wheel and axle loads and increasing the effective tire width.

Another important advantage of the wheel supporting frame is that the number of wheels aligned axially may be reduced and all of the wheels at all times will engage the road surface even though it be rough or irregular in contour.

An advantage of my invention which is very desirable in case pneumatic tires are used is that each wheel is easily accessible and demountable so that each wheel or tire may be changed or repaired readily, independently of other wheels and without disassembling the supporting frame or removing it from the vehicle.

An object of my invention is a wheel supporting frame so shaped that it is strong and durable and will withstand severe lateral and torsional stresses, and yet is light in weight and economical to manufacture.

Another specific object of my invention is a wheel supporting frame which may be easily attached to and detached from the vehicle for replacement or repairs.

Another object of my invention is to support the wheels in a position as far apart axially as possible, yet not protruding laterally beyond the trailer floor, whereby great stability is obtained for a given width.

Other objects and advantages of my invention will become apparent in the following specification, in which reference is made to the drawings by the use of numerals.

In the drawings—

Figure 1:
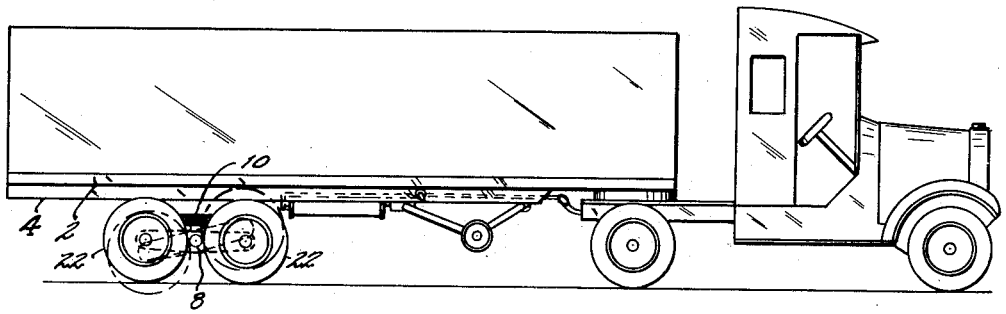
Fig. 1 is a side elevation of a motor truck and an attached semi-trailer, which embodies a form of my invention.

Referring to the drawings, a semi-trailer, one end of which is supported through a fifth wheel connection on a motor truck, is shown by way of illustration. The trailer frame comprises longitudinal sills or intermediate members 2 braced transversely by suitable cross members 6. The rear end of the trailer is supported on transverse beam 8 in a manner later to be described. The forward end of the trailer may likewise be supported on a pivotal frame which in turn is carried on a beam and wheel assemblage similar to that used to support the back end, instead of directly on a truck, as illustrated.

In order to support the trailer frame, springs 10, which may be leaf springs, as illustrated, or other types of springs, are secured to the beam 8 and the trailer frame. A convenient manner of securing the springs to the beam 8 is by means of stirrups 12. These stirrups are preferably elongated and formed in two separate sections, so that they may be placed about the beam 8 from the side instead of from the end, for purposes later to be described. The section of the stirrup engaging the spring may be provided with a flattened portion or boss 14 to form a seat for spring which is clamped firmly against the stirrup by U-bolts 16.

Obviously the sections of the stirrups 12 must be secured together and this may be accomplished by positioning bores therein, so that the U-bolts 16 pass therethrough when properly positioned on the springs, thus dispensing with the need for additional bolts.

To permit the trailer frame to rock through a slight angle about the beam 8, rounded bearing surfaces may be provided on the beam 8, and the stirrups 12 bored to receive a bushing 18 of a suitable material to provide a good bearing surface.

In this manner the weight of the trailer is carried by the beam 8, which in turn is carried in the wheel supporting frames 20, with which my invention is particularly concerned.

Since each set of wheels is similarly mounted a description of one frame and wheel mounting will be given. Due to the above mentioned statutory limitations of the load per axle and wheel and of the number of wheels which may be placed in axial alignment, several wheels and axles must be used and the wheels placed in forward and rearward alignment, and all the wheels must at all times engage the road surface. Furthermore, for purposes of stability and other reasons, the wheels should be kept as far apart laterally of the trailer as possible, but no part of the wheels or mounting must extend beyond permissive statutory width. Obviously it is desirable that the trailer frame likewise be as wide as possible, not only to obtain a larger floor area but also to eliminate the danger resulting from members extending outside of the limits of the frame which may strike other vehicles. The importance of that safety feature is apparent when it is considered that the trailers with which I am concerned are to carry loads of thirty or more tons at speeds of around 30 miles per hour.

The manner in which I comply with these limitations will now be more fully described.

To provide the required tire width, the wheels 22 may be wide enough to accommodate two or more tires, preferably pneumatic tires, as they better withstand high speeds without heating and deteriorating rapidly, and reduce road shocks. These wheels are arranged in forward and rearward sets, and positioned with their outer faces substantially in the plane defined by the side frame members 2 of the trailer. The wheels are mounted on stub shafts 24 rigidly secured to the frame 20 and extending outwardly therefrom.

The frame 20 comprises a longitudinal beam 26, the ends of which are provided with thickened hubs 28 and 30 adapted to receive and support the stub shafts 24. The beam 26 is provided also with an enlarged central hub 32 adapted to rockably engage the beam 8 so as to permit the frame 20 to rock thereabout. The end of the beam 8 may be threaded, as illustrated, to receive a nut for demountably securing the frame 20 thereon. The beam 26 may be relatively deep and, for economy and lightness, should be of open construction, for instance, in the form of a girder with integral lace bars, as illustrated. In the manner described the wheels are mounted with their outer faces substantially in the plane of the outer limits of the trailer frame without any overhang.

However, because of the use of the stub shafts which are unsupported at the outer side of the wheels, the beam 26 is subjected to severe twisting and torsional stresses.

Furthermore, in negotiating sharp curves, the beam 26 is subjected to severe bending moments tending to bend it laterally and to pinch the hub 32 into tight contact with the beam 8. Here it should be pointed out that the lateral stresses resulting from negotiating sharp turns are somewhat reduced by the use of two or more large diameter tires on each wheel, the treads of each tire being separated slightly from the tread of its companion tires, especially if pneumatic tires are used. The separate treads permit the tires to yield slightly laterally, reducing the tendency to skid. Due to the large diameter, each part of the tread need move only a slight distance laterally to compensate for the lateral movement of the wheel. Thus wheels arranged in longitudinal alignment will creep around turns without abrading the tires or skidding.

In order to provide effective width to withstand the lateral stresses without greatly increasing the weight of the entire wheel frame, it is reinforced laterally by struts or brace bars 34 and 36. For strength and lightness, the struts 34 and 36 may be in the form of I beams gradually tapering from the point of junction with the frame 26 inwardly, portions of the web near the neutral axis being left open, if desired.

As illustrated, the struts 34 and 36 join the frame 26 at the hubs 28 and 30 respectively, and extend inwardly of the trailer from the plane of the beam 26, toward the beam 8, terminating in a common hub 38. The hub 38 is in axial alignment with the hub 32 and is adapted to receive the beam 8. Thus a triangular frame is formed which in the plane through the struts 34 and 36 is substantially a constant strength beam providing maximum strength with minimum weight.

Obviously the frame is not only of very great lateral rigidity, but also the torsional stresses of the hubs 28 and 30 are carried to the beam 8 and are there withstood by a reactionary thrust operating at the end of a long rigid lever arm.

Further, by engaging the beam 8 at widely separated hubs 32 and 38, any tendency of the beam 26 to rock out of position normal to the axis of the beam 8 and pinch tightly on the beam is eliminated.

The wheels for each side of the trailer are mounted on similar frames, a spacing collar 40 being provided between the hubs 38 to retain them in proper relative positions on the beam 8. Thus any wheel is easily accessible from the outside of the trailer so that they may be removed or the tires changed in the usual manner without disturbing other wheels or the frame or beam 8.

In order to remove the entire frame 20 it is only necessary to remove the lower section of the stirrup 12, unscrew the nut on the beam 8, and lift the upper section of the stirrup slightly and slide the frame axially off from the beam 8, without detaching the spring and upper section of the stirrup 12 or disturbing the other frame.

In case of heavy loads it is necessary that the trailer be provided with brakes. We prefer to use internal expanding brakes, a portion of the wheel rims forming the brake drum to conserve space. A brake should be provided for each wheel. As illustrated, each brake may include a pair of arcuate brake shoes 50, pivotally mounted at one end in a suitable hub 52 of the beam 26, the other ends being free or held normally together by a spring in the usual manner. To spread the shoes relatively apart a shaft 54, rockably mounted in a hub 56 on the beam 26 and provided with a cam 58 extending between the free ends of the shoes 50 may be used. A lever 60 is provided on the shaft 54 for actuating the same. Power to move the lever 60 may be supplied by a suitable cable 62 secured thereto and passing through the usual guides and an equalizer 63, connected to a winding drum or each pair of levers may be actuated by the usual air brake mechanisms. For clearness in illustration I have shown a brake on one wheel only as all may be identical.

Figure 2:
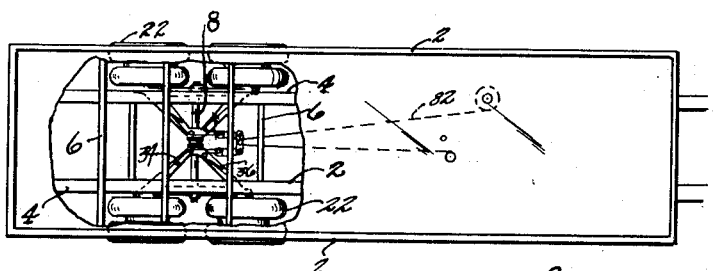
Fig. 2 is a plan view of the trailer illustrated in Fig. 1, part of the trailer floor being removed for clearness.
Figure 3:
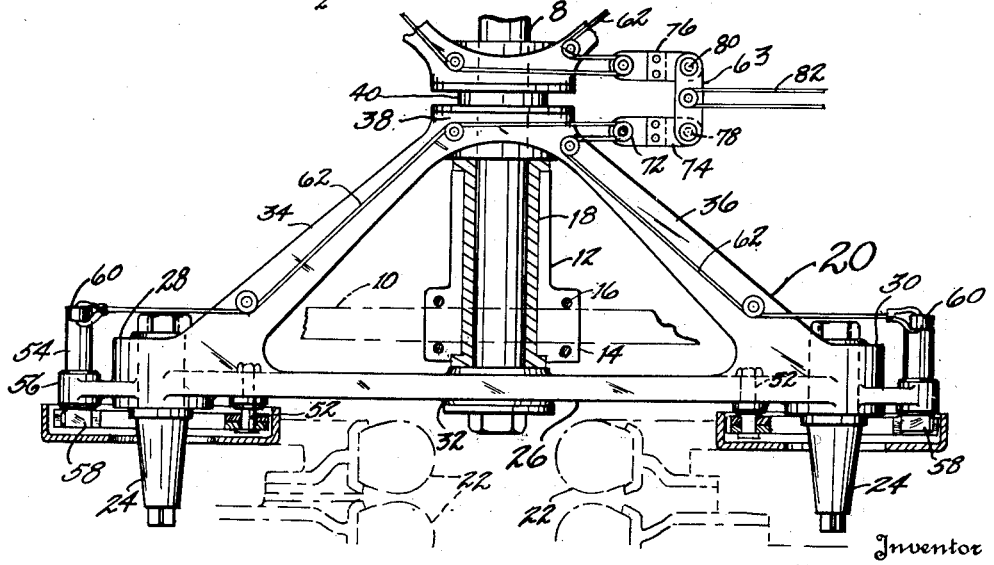
Fig. 3 is an enlarged top plan view of the wheel supporting frame of the trailer illustrated in Figs. 1 and 2.
Figure 4:
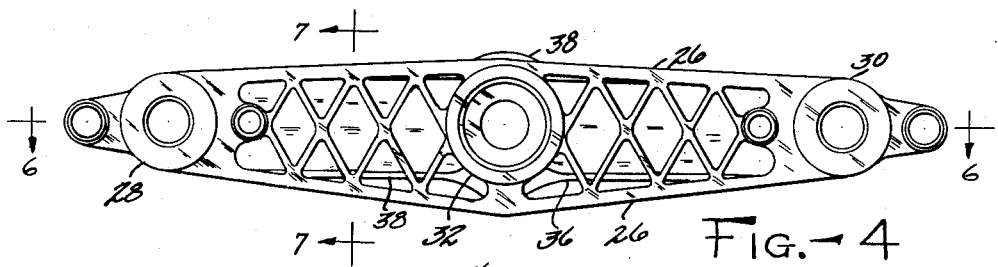
Fig. 4 is a front side elevation of the wheel supporting frame illustrated in Fig. 3.
Figure 5:
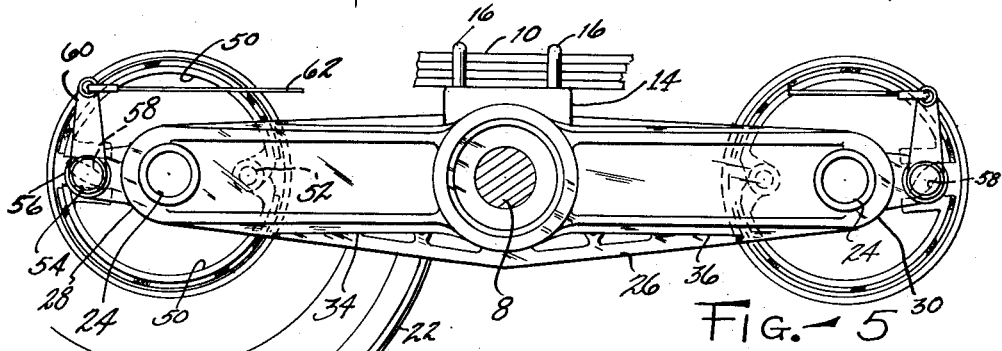
Fig. 5 is a rear side elevation of the wheel supporting frame illustrated in Fig. 3.
Figure 6:
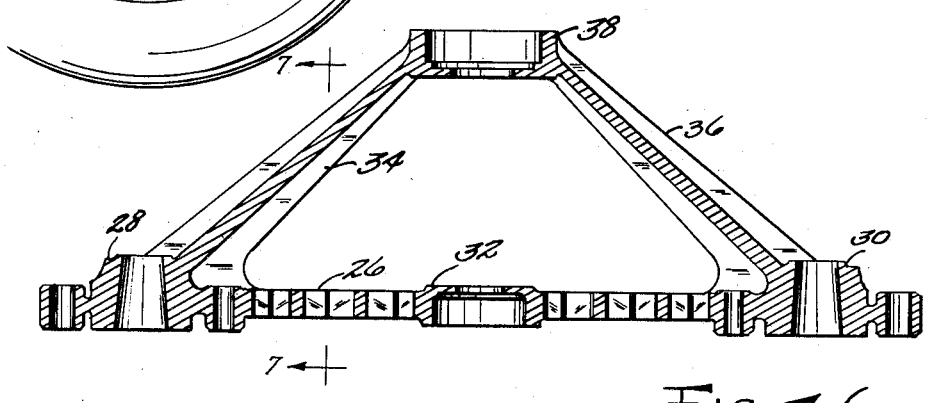
Fig. 6 is a sectional view of the wheel supporting frame taken on a plane indicated by the line 6—6 of Fig. 4.
Figure 7:
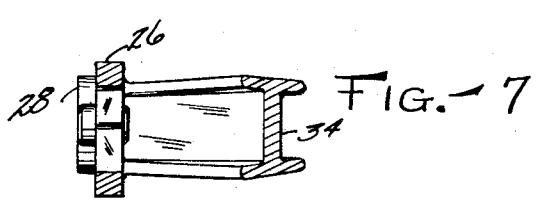
Fig. 7 is a sectional view of the frame taken on a plane indicated by the lines 7—7 in Figs. 4 and 6.

One manner of supplying equalized pressure to all four wheels permitting the wheel frame assemblages to be removed easily is illustrated in Figs. 2 and 3. As there illustrated, a flexible cable 62 may engage each of the levers 60 of one wheel frame and pass through suitable guides around a pulley 72 mounted in a floating bracket 74. The corresponding wheel frame may be similarly equipped and engage a bracket 76. Thus a pull on either bracket equalizes the pull on lever arms of the particular set of wheels. To equalize the pull on the brackets 74 and 76, they may be pivotally secured to an equalizing arm 63, as indicated at 78 and 80 respectively, through which is threaded a cable 82. The cable 82 may be secured to the trailer frame at one of its ends and be threaded through a pulley 84 on the equalizing arm 63, and secured at its other end to a suitable winding drum or other source of power for tensioning the cable. The brackets 74 and 76 should detachably engage the equalizing arm 63 to facilitate independent removal of either frame and wheel assemblage.

In this manner I have provided a vehicle which is economical to manufacture, light in weight, strong and durable and complies with the limitations of the various states.

I do not intend to limit myself to the specific structure shown, but intend to include all structures which embody the principles of my invention. For instance, I do not intend to limit my invention to semi-trailers, but intend to include trailers the front end of which is supported on the usual front wheel and fifth wheel assemblages or front wheel assemblages similar to that herein disclosed for supporting the rear of the semi-trailer described by way of illustration.

I claim:

1. In a vehicle having a frame, means to support said frame, said means including a transverse shaft connected to said vehicle frame, longitudinally extending beams mounted one on each end of said transverse shaft and adapted to rock thereon in a vertical plane, outwardly extending stub shafts on each of the ends of said longitudinal beams, and forwardly and rearwardly aligned wheels on said stub shafts of each beam, inwardly extending rigid struts on each of said longitudinal beams, the inner ends of said inwardly extending struts engaging the transverse shaft substantially at the center thereof and the outer ends of each of said struts engaging an end of one of said longitudinal beams at the stub axle, a housing mounted on said transverse shaft intermediate each longitudinal beam and its respective struts, said housing being rotatable relative to said shaft and supporting the vehicle frame.

2. In a vehicle having a frame, means to support said frame, said means including a transverse shaft connected to said vehicle frame, longitudinally extending beams mounted one on each end of said transverse shaft and adapted to rock thereon in a vertical plane, outwardly extending stub shafts on each of the ends of said longitudinal beams, and forwardly and rearwardly aligned wheels on said stub shafts of each beam, inwardly extending diagonal rigid struts on each of said longitudinal beams, the inner ends of said inwardly extending struts engaging the transverse shaft substantially at the center thereof and the outer ends of each of said struts engaging an end of one of said longitudinal beams at the stub axle, housings mounted on said transverse shaft intermediate each of the longitudinal beams and its respective struts for supporting the vehicle frame, each housing extending inwardly from the adjacent longitudinal beam to the point of engagement of the diagonal struts and the transverse shaft.

3. In a vehicle having a frame, means to support said frame, said means including a transverse shaft connected to said vehicle frame, longitudinally extending beams mounted one on each end of said transverse shaft and adapted to rock thereon in a vertical plane, outwardly extending stub shafts on each of the ends of said longitudinal beams, and forwardly and rearwardly aligned wheels on said stub shafts of each beam, inwardly extending rigid struts on each of said longitudinal beams, the inner ends of said inwardly extending struts engaging the transverse shaft substantially at the center thereof and the outer ends of each of said struts engaging an end of one of said longitudinal beams at the stub axle, housings mounted on said transverse shaft intermediate each of the longitudinal beams and its respective struts for supporting the vehicle frame on said transverse shaft, each of said housings being rotatable relative to the transverse shaft beam and to the longitudinal beam.

In testimony whereof, I hereunto affix my signature.

CHARLES A. ROGERS.